United States Patent [19]

Hattori et al.

[11] 4,020,802

[45] May 3, 1977

[54] FUEL INJECTION SYSTEM FOR INTERNAL COMBUSTION ENGINE

[75] Inventors: Tadashi Hattori, Nishio; Takamichi Nakase, Gamagori; Minoru Nishida, Okazaki, all of Japan

[73] Assignee: Nippon Soken, Inc., Nishio, Japan

[22] Filed: Feb. 20, 1975

[21] Appl. No.: 551,506

[30] Foreign Application Priority Data

Mar. 21, 1974 Japan .............................. 49-32383

[52] U.S. Cl. .................. 123/32 EA; 123/32 EH; 123/32 EL

[51] Int. Cl.² .......................................... F02B 3/00

[58] Field of Search ... 123/32 EA, 139 AW, 119 R, 123/32 EH, 32 EL

[56] References Cited

UNITED STATES PATENTS

| | | |
|---|---|---|
| 3,522,794 | 8/1970 | Reichardt et al. ............. 123/119 R |
| 3,587,536 | 6/1971 | Inoue et al. ..................... 123/119 R |
| 3,699,932 | 10/1972 | Aono et al. ..................... 123/32 EA |
| 3,750,631 | 8/1973 | Scholl et al. ................... 123/32 EA |
| 3,835,820 | 9/1974 | Fujisawa .......................... 123/119 R |
| 3,898,962 | 8/1975 | Honig et al. ................... 123/32 EA |

Primary Examiner—C. J. Husar
Assistant Examiner—Paul Devinsky
Attorney, Agent, or Firm—Cushman, Darby & Cushman

[57] ABSTRACT

A fuel injection system for an internal combustion engine of a type in which a stratified charge of rich air-fuel mixture and lean air-fuel mixture is supplied into the combustion chamber of each cylinder. The fuel injection system includes an electronic control unit whereby when air flow is decreased fuel is sequentially injected into the respective cylinders in accordance with their firing order, whereas when the air flow is increased the fuel is simultaneously injected into all the cylinders.

3 Claims, 8 Drawing Figures

FUEL INJECTION SYSTEM FOR INTERNAL COMBUSTION ENGINE

BACKGROUND OF THE INVENTION

1. Field of the Invention

The present invention relates to a fuel injection system for internal combustion engines, and more particularly the invention relates to a fuel injection system designed for use with an internal combustion engine of a type in which a stratified charge of rich and lean air-fuel mixtures is supplied into the combustion chamber of each cylinder, whereby when the engine is operating with decreased air flow, fuel is sequentially injected into the respective cylinders in accordance with their firing order, whereas when the engine is operating with increased air flow, the fuel is simultaneously injected into all the cylinders.

2. Description Prior the Pior Art

With the conventional internal combustion engines, it has been customary to maintain the ratio of air-fuel mixture supplied into the combustion chamber of each cylinder lower than that of the ideal air-fuel mixture for complete combustion so as to ensure a positive ignition of the mixture. However, such rich mixtures are subjected to incomplete combustion thus producing various harmful exhaust gases such as carbon monoxides (CO) and hydrocarbons (HC) which have recently been posing a serious social problem. Further, the feeding of such relatively rich mixtures results in an increased fuel consumption. Particularly, at lower engine speeds such as during the starting period of the engine, these problems become even more serious since a very rich mixture must be delivered to the cylinders.

On the other hand, it has been found that these problems of noxious exhaust gases, increased fuel consumption, etc. can be overcome by feeding a rich mixture only around the spark plugs of an internal combustion engine and operating the engine with a lean mixture on the whole. A disadvantage of this method arises when an electronically controlled fuel injection system which is superior both in response characteristic and controllability is used as the fuel feed means. While a simultaneous injection type fuel injection system has the advantage of a simple construction, it is difficult to supply a stratified charge of rich and lean air-fuel mixtures into the combustion chambers of each cylinder. On the other hand, to use a sequential injection type fuel injection system even at higher engine speeds at which the problems of noxious exhaust gases and increased fuel consumption are not so serious, each of the cylinders must be provided with a main computing unit which determines the timing and duration of the opening of the fuel injection valves.

SUMMARY OF THE INVENTION

Figure 7:
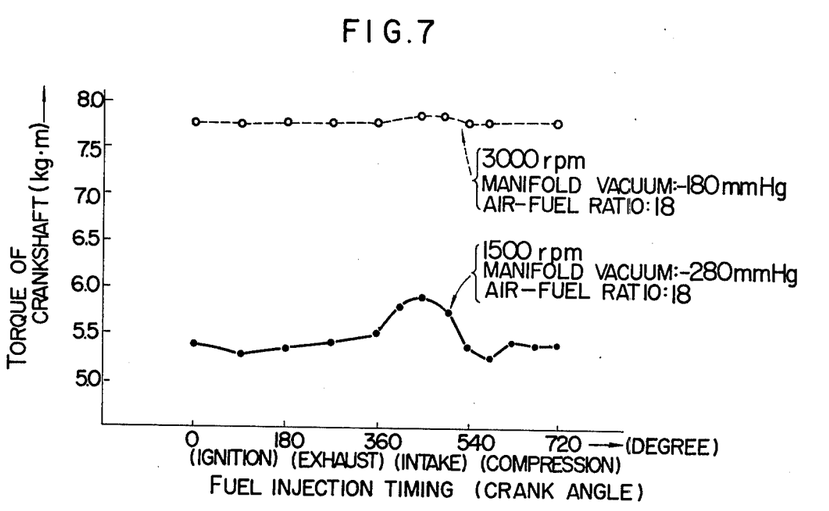
FIG. 7 is a characteristic diagram showing the relationship between the crankshaft torque and the fuel injection timing of the engine.
Figure 8:
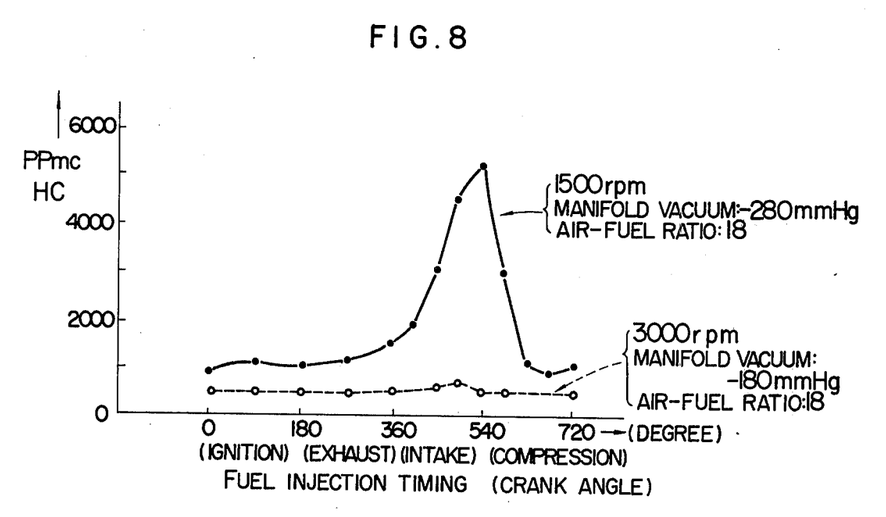
FIG. 8 is a characteristic diagram showing the relationship between the amount of hydrocarbon (HC) emission and the fuel injection timing of the engine.

The present invention has been made on the basis of the demonstrated facts that in an internal combustion engine of a type which is capable of supplying a stratified charge of rich air-fuel mixture and lean air-fuel mixture into the combustion chamber of each cylinder, as shown in FIGS. 7 and 8 of the accompanying drawings, the torque of the crankshaft and the amount of hydrocarbons in exhaust gases are not affected by the timing of fuel injection when the engine is operating at high speeds.

It is therefore an object of the present invention to provide a fuel injection system for an internal combustion engine of a type which is capable of supplying a stratified charge of rich and lean air-fuel mixtures into the combustion chamber of each cylinder, comprising a fuel injection valve positioned in the suction port of each cylinder, and an electronic control unit whereby the fuel injection valves are sequentially opened in accordance with the firing order of their associated cylinders when the engine is operating with the decreased amount of air drawn thereinto, whereas the fuel injection valves are simultaneously opened for the entire cylinders when the engine is operating with the increased amount of air drawn thereinto, thereby reducing the amounts of harmful exhaust gases as well as the consumption of fuel.

It is another object of the present invention to provide such a fuel injection system comprising mode changing computing means for generating elecric signals to change the fuel injection modes in accordance with the amount of air drawn into an internal combustion engine, main computing means for determining the timing of the opening of the fuel injection valves in synchronism with the rotation of the engine and for determining the duration of the opening of the fuel injection valves in accordance with the operating conditions of the engine, and distributing means for distributing the pulse signals to the fuel injection valves in accordance with the electric signals generated from the mode changing computing means, whereby the same objects as the first embodiment are accomplished, and moreover the main computing means for determing the timing and duration of the opening of the fuel injection valves need not be provided for each of the cylinders thus greatly simplifying the construction of the electronic control unit.

The fuel injection system of this invention has among its great advantages the fact that it is highly responsive and superior in controllability with respective to changes in the operating conditions of an internal combustion engine, eliminates the problems of harmful exhaust gas emissions and excessive fuel consumption, and has the advantages of considerably simplifying the construction of the fuel injection control unit. Further, the fuel injection system of the present invention has an advantage that the misfire of an engine can be prevented at the deceleration of a vehicle mounting the engine at which the engine rotates at relatively high speeds while the intake air amount is decreased.

DESCRIPTION OF THE PREFERRED EMBODIMENT

The present invention will now be described in greater detail with reference to the embodiment illustrated in the accompanying drawings.

Figure 1:
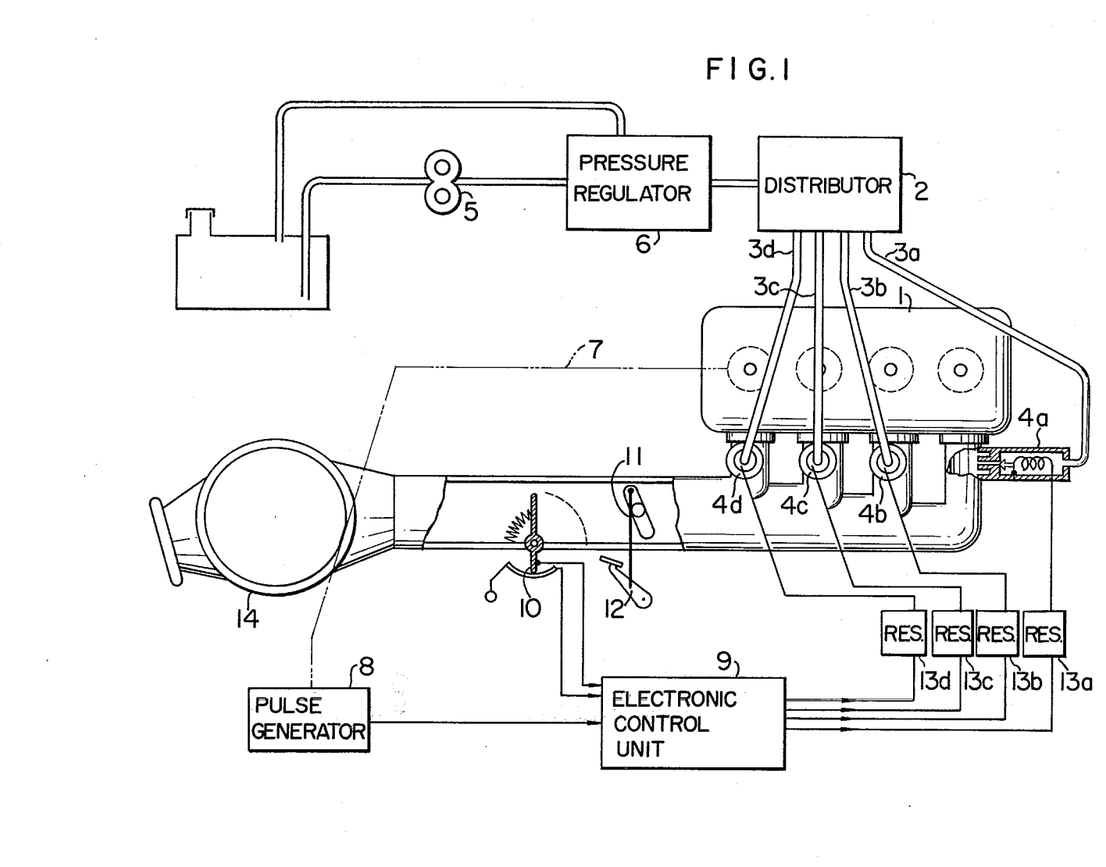
FIG. 1 is a schematic diagram of an internal combustion engine equipped with a fuel injection system according to the present invention.
Figure 2:
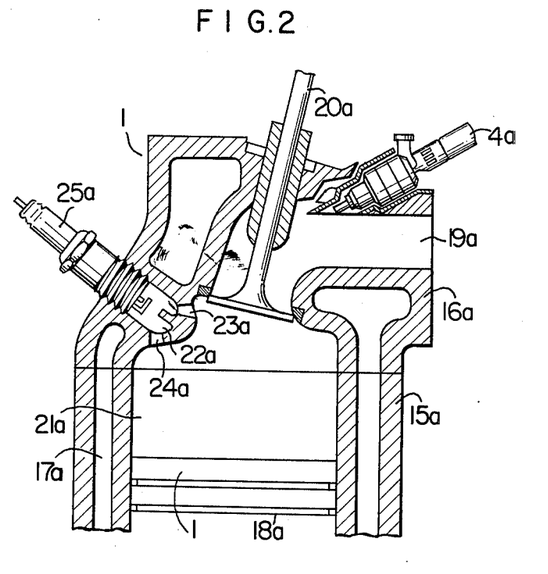
FIG. 2 is a partial longitudinal sectional view of the internal combustion engine shown in FIG. 1.

Referring first to FIG. 1, numeral 1 designates a four-cylinder four-cycle internal combustion engine, 2 a distributor for distributing fuel through fuel lines 3a, 3b, 3c and 3d fuel injection valves 4a, 4b, 4c and 4d mounted on the respective cylinders, 5 a fuel feed pump, 6 a pressure regulator, 7 an engine crankshaft, 8 a pulse generator for generating pulses in accordance with the rotation of the crankshaft 7, 9 an electronic control unit, 10 an air-flow sensor of a weir plate type, for example, which is mounted in the suction duct of the engine 1 to detect the quantity of air drawn into the engine 1 and thereby to measure the fuel requirements of the engine. Numeral 11 designates a throttle valve linked to an accelerator pedal 12, 13a, 13b, 13c and 13d current limiting resistors, 14 an air cleaner. Referring now to FIG. 2, the construction of the first cylinder of the engine 1 will be described by way of example. In FIG. 2, numeral 15a designates a cylindrical cylinder, 16a a cylinder head, 17a a cooling water line, 18a a piston for reciprocating in the cylinder 15a, 19a a suction port branched from the suction duct shown in FIG. 1, 20a an intake valve which is opened on the intake stroke of the engine, 21a a main combustion chamber, 22a a sub-combustion chamber communicating with the main combustion chamber 21a through an air inlet hole 23a and an injection hole 24a, 25a a spark plug positioned in the sub-combustion chamber 22a. The fuel injection valve 4a is positioned in the suction port 19a so that the injected fuel is directed to the air hole 23a. The other cylinders of the engine 1 are constructed in the same manner as the first cylinder.

Figure 3:
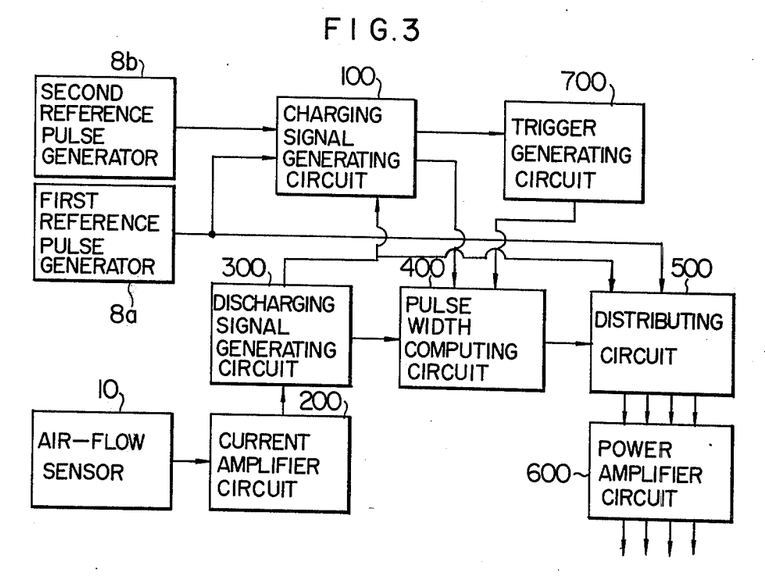
FIG. 3 is a block diagram showing an embodiment of the fuel injection system according to the present invention.
Figure 4:
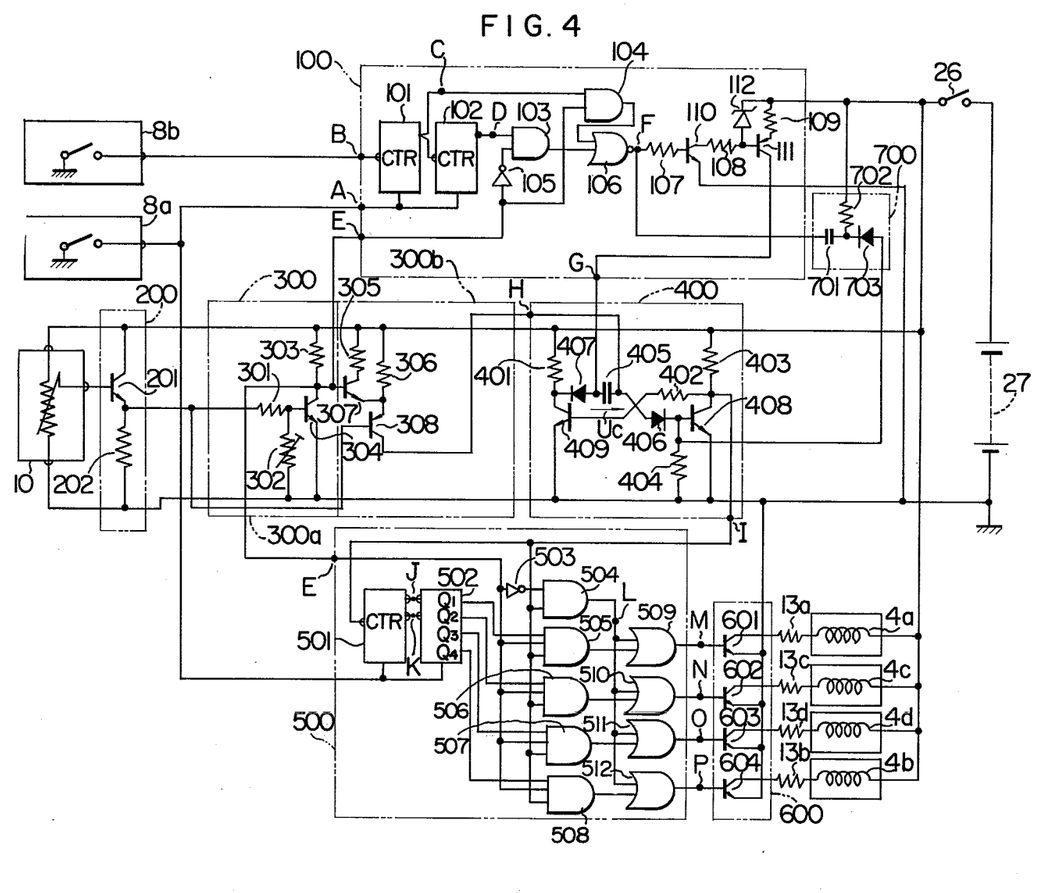
FIG. 4 is a wiring diagram for the fuel injection system of the invention shown in FIG. 3.

Next, the construction and operation of a preferred embodiment of the present invention shown in the block diagram of FIG. 3 will be described with reference to the circuit diagram of FIG. 4 showing principally the electronic control unit 9 and the waveform diagrams of FIGS. 5 and 6 for explaining the operation of its component elements. In FIG. 4, numeral 8a designates a first reference pulse generator for generating a pulse for every two complete revolutions of the crankshaft 7 (720° of crankshaft rotation) as shown by the waveform diagram (A) of FIG. 5, 8b a second reference pulse generator for generating 8 second reference pulses repeated at regular intervals for every two complete crankshaft revolutions (720° of crankshaft rotation) as shown in the waveform diagram (B) of FIG. 5. The timing of the first reference pulses is preset so that the first reference pulse is generated $\alpha°$ of rotation of the crankshaft 7 before the beginning of the intake stroke of the first cylinder. Numeral 10 designates the previously mentioned air-flow sensor whose output voltage increases as the operating speed of the engine 1 increases, that is, it increases in proportion to increase in the quantity of air drawn into the engine 1. Numeral 100 designates a charging signal generating circuit including a counter 101 and a counter 102 whose resetting signals are provided by the first reference pulses, AND circuits 103 and 104, an inverter 105, a NOR circuit 106, resistors 107, 108 and 109, transistors 110 and 111 and a Zener diode 112. Numeral 200 designates a current amplifier circuit including a transistor 201 and a resistor 202, 300 a discharging signal generating circuit comprising, in combination, a mode changing computing element 300a including resistors 301, 302 and 303 and a transistor 304 and a discharging current control element 300b including resistors 305 and 306 and transistors 307 and 308 with the output terminal of the mode changing computing element 300a connected to the input terminal of the inverter 105 and the input terminal of the AND circuit 104 in the charging signal generating circuit 100. Numeral 400 designates a pulse width computing circuit including resistors 401, 402, 403 and 404, a capacitor 405, diodes 406 and 407 and transistors 408 and 409. The ends of the capacitor 405 are respectively connected to the output terminal of the charging signal generating circuit 100 and the output terminal of the discharging signal generating circuit 300. Numeral 500 designates a distributing circuit including a two-stage counter 501 and a decoder 502 whose reset signals are provided by the said first reference pulses, an inverter 503, AND circuits 504, 505, 506, 507 and 508 and OR circuits 509, 510, 511 and 512. Numeral 600 designates a power amplifier circuit including transistors 601, 602, 603 and 604 which respectively energize the exciting coils of the fuel injection valves 4a, 4b, 4c and 4d through the resistors 13a, 13b, 13c and 13d. The firing order is the first, second, third and fourth cylinders, and the fuel injection valves are arranged so that the fuel injection valves are energized in the order 4a, 4b, 4c and 4d. Numeral 700 designates a trigger generating circuit including a capacitor 701, a resistor 702 and a diode 703, 26 a key switch, 27 a battery.

With the construction described above, the operation of the fuel injection system of this invention will now be described with reference to the waveforms (A) - (P) shown in FIGS. 5 and 6. When the first reference pulse generator 8a generates the first reference pulse at a point A in FIG. 4 as shown by the waveform (A) of FIG. 5, the counters 101 and 102 are reset. As the second reference pulse generator 8b generates the second reference pulses at regular intervals of 90° of crankshaft rotation as shown by the waveform (B) of FIG. 5 at a point B in FIG. 4, the frequency of the second reference pulses is divided by the counters 101 and 102, respectively, thus generating at their respective output terminals or points C and D output signals which are either at the 1 or 0 level as will be seen from the waveforms (C) and (D) of FIG. 5. On the other hand, when the accelerator pedal 12 is depressed lightly so that the throttle valve 11 is placed in a position which blocks the flow of air, that is, when the engine 1 is operating at low speeds with the decreased quantity of air drawn thereinto, the output voltage of the air-flow sensor 10 and the current amplifier circuit 200 are low. Consequently, this low output voltage renders the transistor 304 of the discharging signal generating circuit 300 nonconductive and the output terminal of the mode changing computing element 300a or a point E goes to the 1 level. On the contrary, when the engine 1 is operating at high speeds with the quantity of air drawn thereinto being higher than a predetermined value, the output voltage of the air-flow sensor 10 and hence the output voltage of the current amplifier circuit 200 increases, so that the transistor 304 of the discharging signal generating circuit 300 is rendered conductive and the point E goes to the 0 level. The output signal of the mode changing computing element 300a varies in accordance with the quantity of air drawn into the engine as shown by the waveform (E) of FIG. 5. When the output signal of the mode changing computing element 300a is at the 1 level, a discharging current which is determined by the resistors 305 and 306 of the mode changing computing element 300b and the output voltage of the current amplifier circuit 200 is applied as the output signal of the discharging signal generating circuit 300 to the pulse width computing circuit 400, whereas when the output signal of the mode changing computing element 300a is at the 0 level, a discharging current which is determined by the resistor 306 and the output voltage of the current amplifier circuit 200 is similarly delivered as the output signal of the discharging signal generating circuit 300. Thus, the discharging current decreases as the quantity of air drawn in decrease, and it increases as the quantity of air drawn in increases.

Figure 5:
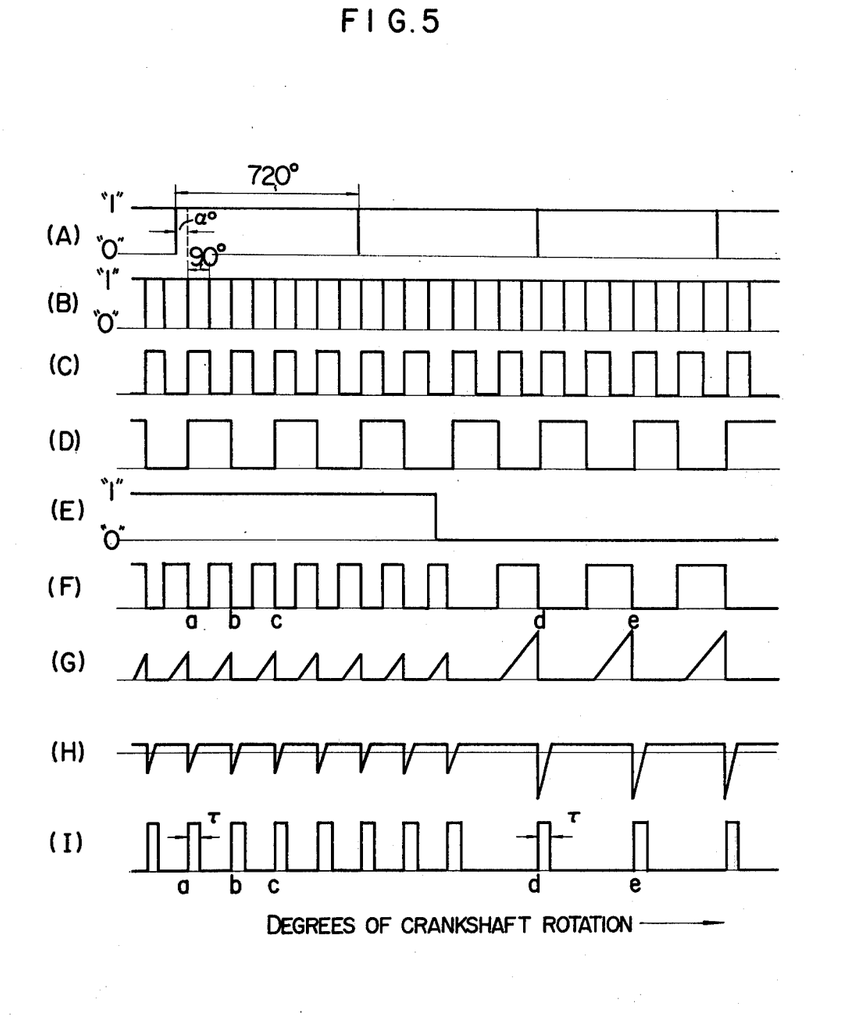
FIGS. 5 and 6 are signal waveform diagrams useful for explaining the operation of the fuel injection system of the invention.

On the other hand, the output signals of the counters 101 and 102 are operated on along with the output signal of the mode changing computing element 300a, so that as shown by the waveform (F) of FIG. 5, either the rectangular pulses having a period corresponding to the 180° of crankshaft rotation (at lower engine speeds) or the rectangular pulses having a period corresponding to the 360° of crankshaft rotation (at high engine speeds) are generated at the output terminal of the NOR circuit 106 or a point F in accordance with the quantity of air drawn into the engine 1. The transistor 110 is rendered conductive at the 1 level of the rectangular pulse signals shown by the waveform (F) of FIG. 5, and a constant current flows as the charging signal to the pulse width computing circuit 400 through the current regulator circuit including the resistor 109, the transistor 111 and the Zener diode 112. On the contrary, when the rectangular pulse signals (the waveform (F) of FIG. 5) are at the 0 level, there is no flow of the fixed current. When there is the flow of the fixed current, the capacitor 405 in the pulse width computing circuit 400 is charged and the potential at the end of the capacitor 405 or a point G rises as shown by the waveform (G) of FIG. 5. During this period, the discharging current from the discharging signal generating circuit 300 renders the transistor 408 conductive through the diode 406. At the instant that the charging of the capacitor 4 is completed, at each of the end points of the falling edges of the rectangular pulses shown in FIG. 5 (F), i.e., points a, b, c, d, e, etc., a negative trigger signal is generated at the output terminal of the trigger generating circuit 700 to render the transistor 408 nonconductive and the output terminal of the pulse width computing circuit 400 or a point I goes from the 0 to 1 level. When the transistor 408 changes its state, the transistor 409 is rendered conductive and the potential at the point G falls rapidly. As a result, the charge stored in the capacitor 405 during the charging period is discharged and dissipated by the discharging current corresponding to the amount of air drawn into the engine. In this case, while the potential at a point H falls rapidly to a negative level as shown by the waveform (H) of FIG. 5, the discharging current proportional to the amount of air drawn in causes the potential at the point H to rise gradually and the transistor 408 is again rendered conductive. During the time that the transistor 408 is in its nonconductive state, a pulse having a time width $\tau$ is generated at the output terminal of the pulse width computing circuit 400 or the point I, and this time width $\tau$ is proportional to the amount of air drawn into the engine. The number of the pulses generated for every 720° of crankshaft rotation is four during lower engine speeds, and the number is two during higher engine speeds.

Figure 6:
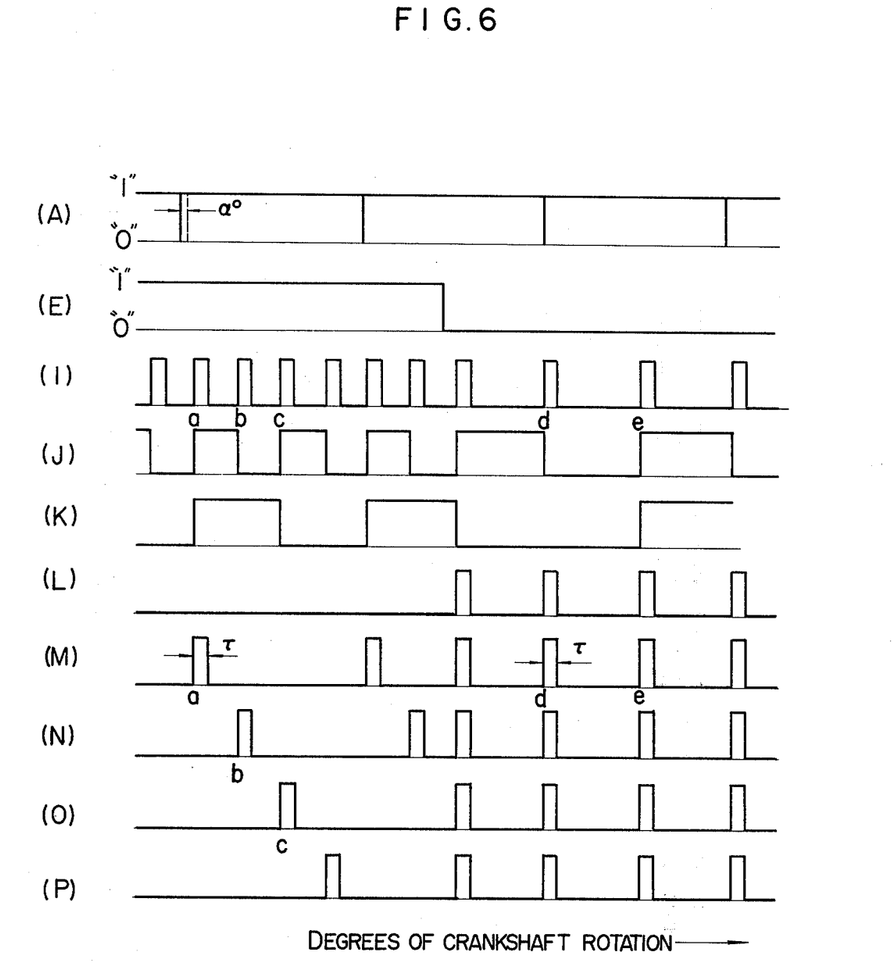

The pulses are then supplied to the distributing circuit 500 and are frequency divided by the two-stage stage counter 501 which in turn generates at its first stage output terminal or a point J and second stage output terminal or a point K the output signals shown by the waveforms (J) and (K) of FIG. 6. The combinations of the signals (J, K) generated at the points J and K are decoded by the decoder 502, so that output terminals $Q_1$, $Q_2$, $Q_3$ and $Q_4$ of the decoder 502 sequentially change from the 0 state to the 1 state in accordance with the signal combinations (1, 1), (0, 1), (1, 0) and (0, 0). Assuming now that the engine 1 is operating at low speeds, the 1 signal at the point E or the output terminal of the mode changing computing element 300a, the signal at the point I or the output terminal of the pulse width computing circuit 400 and the output signals of the decoder 502 are applied to the AND gate 505, 506, 507 and 508, respectively. Thus, only that AND circuit whose input signals are all at the 1 level generates a 1 output signal and only that OR circuit which is assoicated with that particular AND circuit generates a 1 output signal. In other words, as mentioned previously, the output terminals $Q_1$, $Q_2$, $Q_3$ and $Q_4$ of the decoder 502 sequentially go to the 1 level, and thus there is no possibility of the two or more output terminals going to the 1 level simultaneously. Consequently, the OR circuits 509, 510, 511 and 512 sequentially generate a 1 output signal at their respective output terminals or points M, N, O and P in this order. As will be seen from the waveforms (M), (N), (O) and (P) of FIG. 6, the pulse width of these output signals is the same with the pulse width $\tau$ of the output signal of the pulse width computing circuit 400. These output signals sequentially render conductive the transistors 601, 602, 603 and 604 in the power amplifier circuit 600 and thus the fuel injection valves 4a, 4b, 4c and 4d are sequentially opened. On the other hand, when the engine 1 is operating at high speeds, a 0 output signal is generated at the point E of the mode changing computing element 300a and this 0 output signal causes the output terminal of the inverter 503 to go to the 1 level. When the output signal of the pulse width computing circuit 400 is at the 1 level, the AND circuit 504 generates a 1 output signal as shown by the waveform (L) of FIG. 6. This 1 output signal is simultaneously delivered to the output terminals of the OR circuits 509, 510, 511 and 512 or the points M, N, O and P as shown by the waveforms (M), (N), (O) and (P) of FIG. 6. Consequently, the transistors 601, 602, 603 and 604 in the power amplifier circuit 600 are simultaneously rendered conductive and hence the fuel injection valves 4a, 4b, 4c and 4d are also simultaneously energized and opened to inject fuel into all the cylinders simultaneously. In this case, the fuel is injected into all the cylinders twice for every two complete crankshaft revolutions (720° of crankshaft rotation). The purpose of this is to provide a higher output when the engine 1 is operating at high speeds, and the number of injections may vary for different types of engines.

Referring again to FIG. 2, when the engine 1 is operating at low speeds, as mentioned earlier, the intake valve 20a is opened simultaneously with the opening of the fuel injection valve 4a, so that the large portion of the fuel injected into the suction port 19a flows into the sub-combustion chamber 22a thus readily forming a layer of the rich mixture, and a portion of the fuel forms a layer of the lean mixture in the main combustion chamber 22a. Consequently, although the mixture is lean on the whole, the rich mixture in the sub-combustion chamber 22a is readily ignited and the flame propagates to the main combustion chamber 22a thus completely burning the lean mixture. Further, since the duration of the opening of the fuel injection valves is proportional to the amount of air drawn in, the air-fuel ratio of the mixture as a whole is maintained constant. Still further, while, as mentioned previously, the fuel is simultaneously injected into all the cylinders when the engine 1 is operating at high speeds, the fuel may be easily ignited and burned completely due to the combined effects of the fact that the fuel is easily atomized in the suction port 19a at the higher engine speeds although the intake valve 20a is held in the closed position and that the fuel injection quantity is also increased as compared with that supplied at the lower engine speeds.

While, in the embodiment of the present invention described hereinabove, the fuel injection system according to the invention is used in the operation of an internal combustion engine of the type in which each cylinder is provided with a main combustion chamber and a sub-combustion chamber, the fuel injection system of this invention may be effectively employed in the operation of any other types of internal combustion engines which are capable of supplying a layer of rich mixture around the spark plug in the combustion chamber of each cylinder. Further, while only one examplary construction and method of computation have been illustrated and described for the electronic control unit, it should be apparent to those skilled in the art that the present invention is not intended to be limited to the details shown, since various modifications may be readily made thereto without departing from the spirit and scope of the invention.

What is claimed is:

1. In combination with an internal combustion engine having a plurality of cylinders, each thereof including a main combustion chamber, a sub-combustion chamber interconnected to said main combustion chamber through a hole, an intake valve mounted in a passage interconnecting said combustion chambers and a suction port and a spark plug positioned in said sub-combustion chamber, a fuel injection system comprising:
   a fuel injection valve positioned in the suction port of each of said cylinders for injecting fuel toward said hole to form a rich air-fuel mixture in said sub-combustion chamber;
   pulse generating means for generating reference pulses in synchronism with the rotation of said engine;
   an air-flow sensor positioned in the suction duct of said engine for generating a signal voltage corresponding to the quantity of air drawn into said engine;
   a pulse width computing circuit responsive to said reference pulses and said signal voltage for generating a pulse for controlling the timing and duration time of the opening of said fuel injection valves;
   injection mode changing computing means connected to said air-flow sensor for generating a signal indicative of the operating conditions of said engine in response to said sensor signal voltage; and
   a distributing circuit connected between said pulse width computing circuit and said fuel injection valves including logic means for receiving said signal generated from said injection mode changing computing means, and including further layer means for receiving said pulse from said pulse width computing circuit is sequentially applied to said fuel injection valves in the intake stroke of said cylinders in accordance with the firing order of said cylinders when the amount of air drawn into said engine is smaller than a predetermined value, whereas said pulse from said pulse width computing circuit is applied simultaneously to said fuel injection valves for all of said cylinders when said amount of air is greater than said predetermined value.

2. A fuel injection system according to claim 1, further comprising a charging signal generating circuit connected between said pulse generating means and said pulse width computing circuit and responsive to said reference pulses from said pulse generating means to generate a constant current charging signal having a time width inversely proportional to the number of revolutions of said engine, and discharging current control means connected between said air flow sensor and said pulse width computing circuit to generate a discharging signal of a current corresponding to the output voltage of said air-flow sensor, whereby said pulse width computing circuit accomplishes the charging and discharging of electric energy in accordance with said charging signal and said discharging signal to compute the duration of the opening of said fuel injection valves.

3. A fuel injection system according to claim 2, wherein said charging signal generating circuit is further connected to said injection mode changing computing means and responsive to the output signal of said injection mode changing computing means to vary the number of charging signal pulses generated in one operating cycle of said engine and vary the number of opening operations of said fuel injection valves in said operating cycle of said engine.

* * * * *

UNITED STATES PATENT OFFICE
CERTIFICATE OF CORRECTION

Patent No. 4,020,802   Dated May 3, 1977

Inventor(s) Tadashi Hattori et al.

It is certified that error appears in the above-identified patent and that said Letters Patent are hereby corrected as shown below:

Column 8, lines 18-20 should read as follows:

--computing means, and including further logic means for receiving said pulse from said pulse width computing circuit for sequentially applying said pulse to--

Signed and Sealed this

*Twenty-seventh* Day of *September 1977*

[SEAL]

*Attest:*

RUTH C. MASON
*Attesting Officer*

LUTRELLE F. PARKER
*Acting Commissioner of Patents and Trademarks*